United States Patent [19]

Matsui et al.

[11] Patent Number: 5,793,924
[45] Date of Patent: Aug. 11, 1998

[54] COMPILER SYSTEM

[75] Inventors: Masafumi Matsui; Koji Saito, both of Kanagawa, Japan

[73] Assignee: Sony Corporation, Tokyo, Japan

[21] Appl. No.: 750,276

[22] PCT Filed: Apr. 3, 1996

[86] PCT No.: PCT/JP96/00919

§ 371 Date: Dec. 5, 1996

§ 102(e) Date: Dec. 5, 1996

[30]    Foreign Application Priority Data

Apr. 7, 1995  [JP]  Japan .................................. 7-108206

[51] Int. Cl.$^6$ .................................. H04N 5/93; H04N 5/91
[52] U.S. Cl. .................................. 386/52; 386/46
[58] Field of Search .................................. 386/46, 52, 57, 386/60, 65, 4, 53; 760/32; H04N 5/93, 5/91

[56]    References Cited

U.S. PATENT DOCUMENTS 5,063,470  11/1991  Fukuzawa et al. .................. 360/137
5,621,536  4/1997  Kizu .................................. 386/52

FOREIGN PATENT DOCUMENTS 2-259880  10/1990  Japan .
4-235589  8/1992  Japan .
5-257896  10/1993  Japan .
5-282374  10/1993  Japan .

*Primary Examiner*—Robert Chevalier
*Attorney, Agent, or Firm*—Frommer, Lawrence & Haug LLP; William S. Frommer

[57]    ABSTRACT

A compiler system includes a position lever for designating an absolute position of video signals used as a material. Changes in position of the position lever linearly correspond to changes in absolute position on the time axis of the material. The position lever is used to jump to an approximate position near a desired compile point. The compiler system includes a search dial for designating a position of the material relative to the jumped position in response to its rotation. Rotation of the search dial causes changes in pictures on the display from one to another in response to the direction and amount of the rotation. The search dial is used to access to the picture including the desired search point.

4 Claims, 3 Drawing Sheets

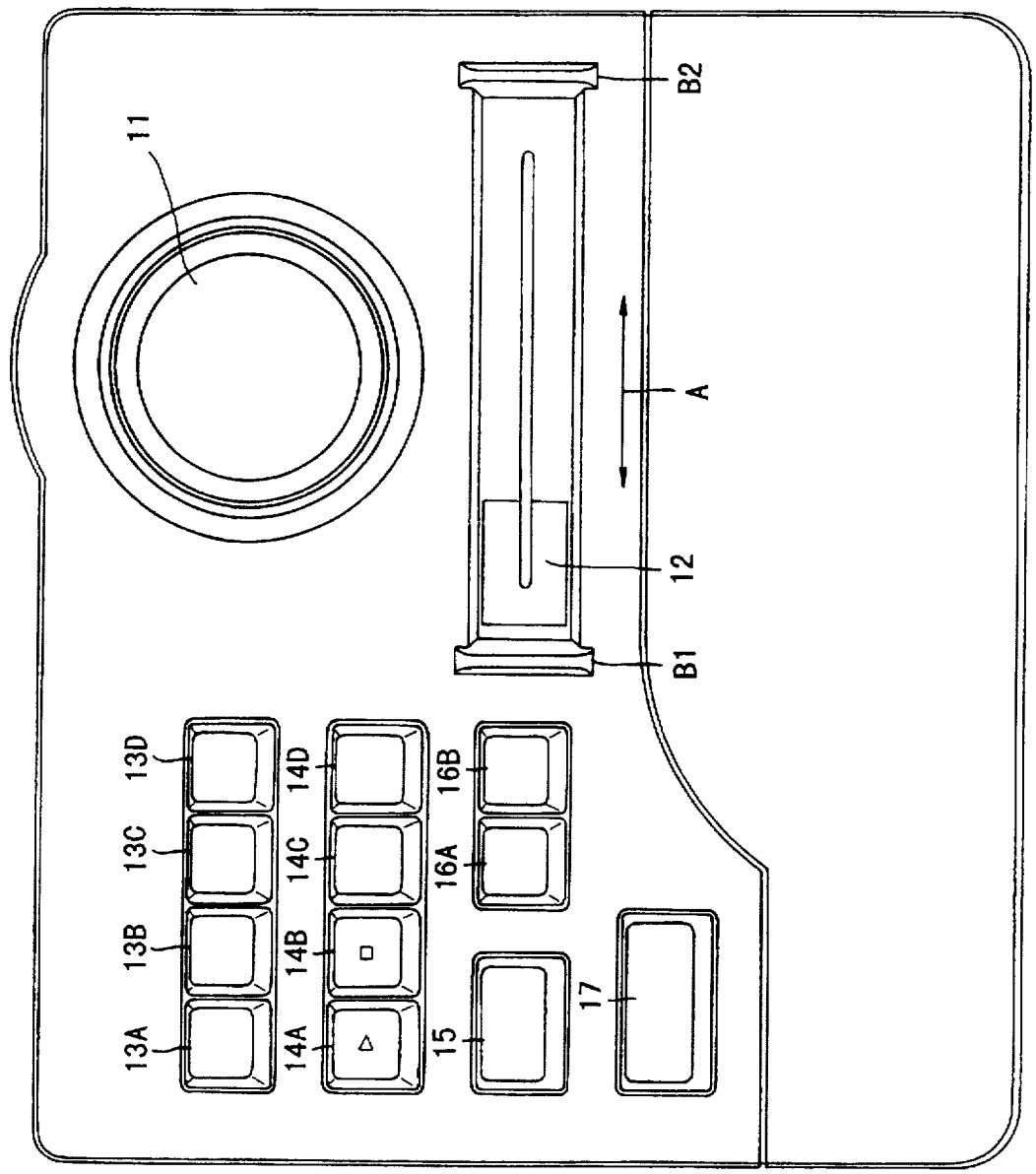

COMPILER SYSTEM

TECHNICAL FIELD

This invention relates to a compiler system for compilation of a material in form of video signals recorded on a magnetooptical disk, for example.

BACKGROUND ART

Conventional video compiler systems used a magnetic tape to record video signals through VTR, and proceeded with compilation referring to desired compile points while reproducing the magnetic tape through VTR and detecting the compile points from the magnetic tape. To detect a desired compile point from a tape through VTR, users must repeat cue and review operations. Therefore, conventional video compiler systems were inefficient in operation and took time for compilation.

In view of the situation, there are recent compiler systems which use a random access storage device such as magnetooptical disk or hard disk to record video signals, and proceed with compilation referring to compile points while reproducing the storage device and detecting the compile points.

That is, a compiler system using a random access storage device, such as magnetooptical disk, consists of a computer, display, entry devices such as keyboard and mouse, and magnetooptical disk drive. Recorded on the magnetooptical disk are digital video signals used as a material. The computer may be either an exclusive one for compilation or a general purpose personal computer installed with a compiler program. A control panel is an entry device to assist jobs for compilation. To proceed with compilation using the aforementioned compiler system, images as a material is retrieved on the display. A user will search out a desired compile point from the material image, and proceeds with deletion, replacement of selective portions, or other jobs for compilation.

Recent developments in graphic user interface make it possible for users to use a mouse in compile operations with a compiler system using a random access storage device. Operation through a mouse is advantageous because any user can easily operate it without remembering complex commands.

A major job of compilation is to search for compile points in the frame-to-frame unit from a material which is typically of a volume lasting for decades of minutes to several hours. This way of operation is not easy only with operation of a mouse and a keyboard alone.

That is, a user must find out a position near a compile point from a material lasting for decades of minutes to several hours. When a mouse is used to do this, a scroll bar is shown on the display. The user moves the mouse pointer onto the cursor on the stroll bar and drags the cursor to an approximately desired position. However, the amount of movements of the mouse required for such operations is too large to minimize the time for compilation.

DISCLOSURE OF INVENTION

The invention provides a compiler system for compiling video signals recorded on a random access storage device, which is easy to operate and enables quick compilation.

The compiler system includes a recording medium storing a video signal used as a material and an operator means for effecting compile operations onto the material video signal on the recording medium, and the operator means comprises a first position designator means for designating an absolute position of the time axis of the material, and a second position designator means for designating a relative position from the absolute position of the material.

The system includes a position lever for designating the absolute position of the material video signal. Positions of the position lever are linearly proportional to absolute positions on the time axis of the material. Therefore, a user can easily jump to a compile point by operating the position lever. The system also includes a search dial for designating a position of the material by adjusting the amount of rotation of the dial. Since pictures are turned in accordance with the direction and amount of rotation of the dial, a user can easily access to a desired image to be found out.

BRIEF DESCRIPTION OF DRAWINGS

FIG. 2 is a plan view of a control panel used in the embodiment of the invention.

BEST MODE FOR CARRYING OUT THE INVENTION

Figure 1:
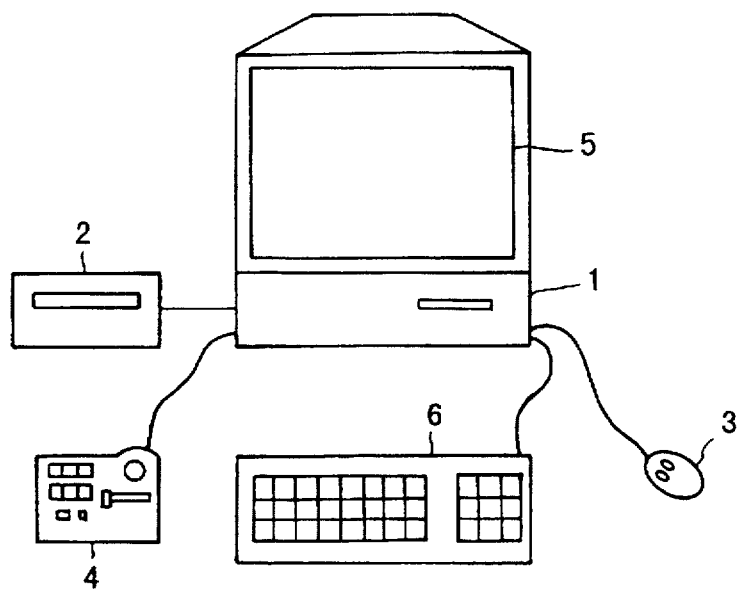
FIG. 1 is a perspective view of a video compiler system to which the invention is applied.

In FIG. 1 showing an embodiment of the invention, numeral 1 denotes a computer which totally administrates video compile operations. The computer 1 may be either a computer in exclusive use for video compilation or a general use personal computer installed with a video compilation program.

Connected to the computer 1 is a magnetooptical disk drive 2 used as a random access storage device for recording video signals used as a material. The storage device for recording material digital video signals is desired to have an ample capacitance and to permit random access. A magnetooptical disk, which can be realized in form of a large capacitance disk, is a suitable storage device for recording video signals. Also usable is a fixed magnetic disk, or the like, in lieu of the magnetooptical disk drive.

A keyboard 6 and a mouse 3 are also connected to the computer 1. The keyboard 6 and the mouse 3 are entry devices through which major operations of the computer 1 are instructed. Further connected to the computer 1 is a CRT display 5.

A control panel 4 is also connected to the computer 1. The control-panel 4 supports dials, levers, keys and other elements, including a search dial, position lever, key for determining a compile point, which facilitate efficient compile operations.

FIG. 2 shows an aspect of the control panel 4. A search dial 11 is provided on the control panel 4. When the search dial 11 is rotated, pictures are moved from one to another by the amount of time corresponding to the amount and the direction of the rotation. It can be manipulated with the same sense as for any search dial in a conventional compiler system using VTR.

The control panel 4 also supports a position lever 12 for sliding movements in the direction shown by the arrow A. The position lever 12 indicates positions of the time axis of video signals of a single material. When the position lever 12 is located at the left end B1, the first picture of the material is displayed. When the position lever 12 is located at the right end B2, the last picture of the material is displayed. Positions of the position lever 12 and positions on the time axis of the material are in a linear responsive relationship. Therefore, for example, if the length of a material is 30 minutes and the position lever 12 is located at the center, then a picture at the 15 minutes position of the material is displayed.

Further provided on the control panel 4 are keys 13A through 13D than can be assigned to desired operations, play key 14A, stop key 14B, frame feed key 14C for changing the display backward by one frame, frame feed key 14D for the display forward by one frame, mark key 16A for marking the start point of compilation, mark key 16B for making the end point of compilation, and all stop key 17 for stopping all operations. A pad portion 18 is also provided on the control panel 4 to permit a user to stabilize his wrist on it for more reliable operation.

For compile operations, a user typically operates the mouse 3 with his right hand and the control panel 4 with his left hand while looking at the display 5. The user can readily find out a compile point through manipulation of the search dial 11 and the position lever 12 provided on the control panel 4 as explained above.

In greater detail, a picture near a compile point is accessed by operating the position lever 12. The position lever 12 can be slidably moved, and its movement linearly responds to a change in absolute position on the time axis of the material. Therefore, the use of the position lever 12 makes it easy to jump to a picture near the compile point. Once a picture near the compile point is found out with the position lever 12, the desired search point is accessed by operating the search dial 11. Since movement of the search dial 11 causes changes of pictures on the display relative to the jumped position in accordance with the direction and the amount of the rotation of the dial, the picture with the desired search point can be found out easily and quickly.

Figure 3:
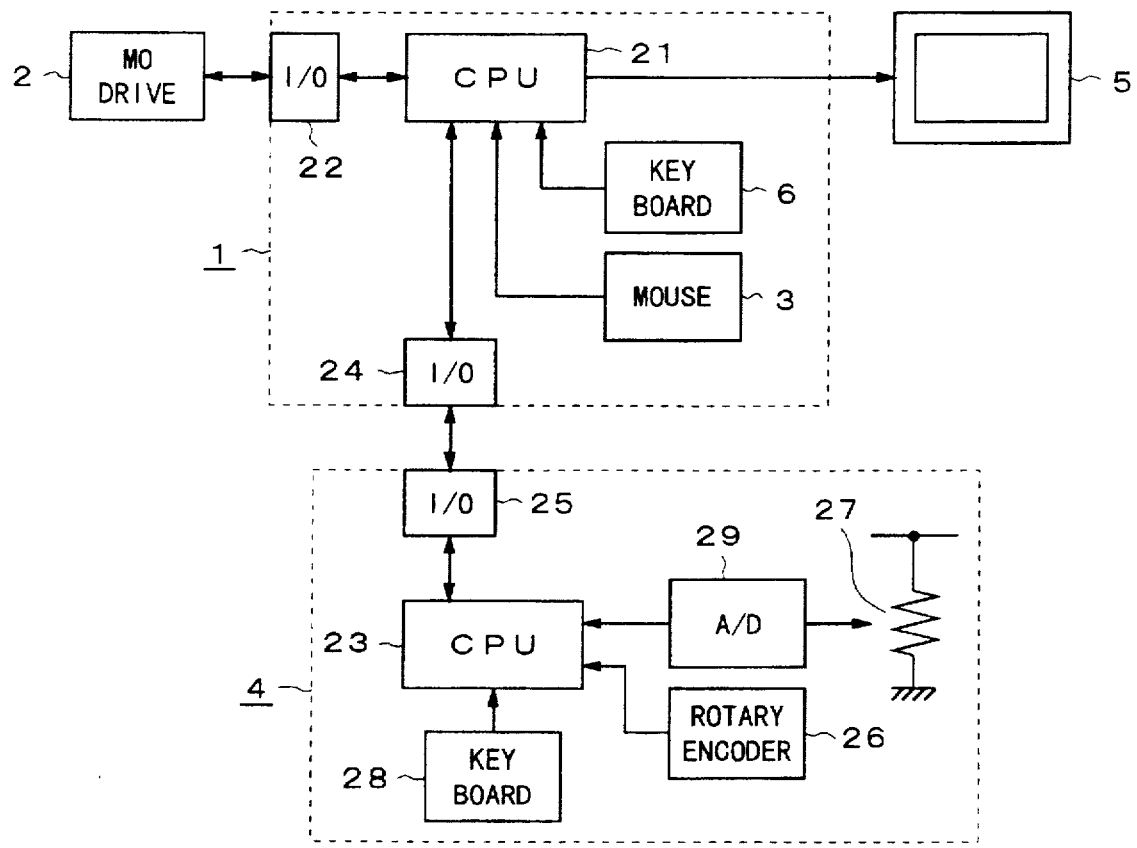
FIG. 3 is a block diagram of the video compiler system to which the invention is applied.

FIG. 3 shows an arrangement of a video compile system to which the invention is applied. In FIG. 3, the computer 1 mainly comprises CPU 21. CPU 21 includes ROM for storing firmware and RAM for operations of variables, both not shown. CPU 21 receives instructions through the key board 6 and the mouse 3. CPU 21 and the display 5 are connected, and CPU 21 and the magnetooptical drive 2 are connected through an interface 22.

The control panel 4 includes CPU 23. CPU 23 of the control panel 4 and CPU 21 of the computer 1 are connected through interfaces 24 and 25. CPU 23 receives instructions through the keyboard 28, A/D converter 29 and rotary encoder 26 prepared on the control panel 4. The keyboard 28 has functions of the keys 13A through 13D, play key 14A, stop key 14B, frame feed keys 14C, 14D, enter key 15, mark keys 16A, 16B, all stop key 17, and so forth.

The A/D converter 29 is provided to enter the position of the position lever 12. When the position lever 12 is moved, it causes a change in resistance value of a variable resistor 27 and hence a change in input voltage to the A/D converter 29. The voltage of the variable resistor 27 is converted into a digital value by the A/D converter 29. The value of the output voltage of the variable resistor 27 is detected from the A/D converter 29, and the current position of the position lever 12 is known from the detected value.

The rotary encoder 26 is provided to enter the amount and the direction of rotation of the search dial 11. When the search dial 11 is moved, its angle and direction are detected by the rotary encoder 26. Thus, the amount and direction of rotation of the search dial 11 are known from an output of the rotary encoder 26.

Figure 4:
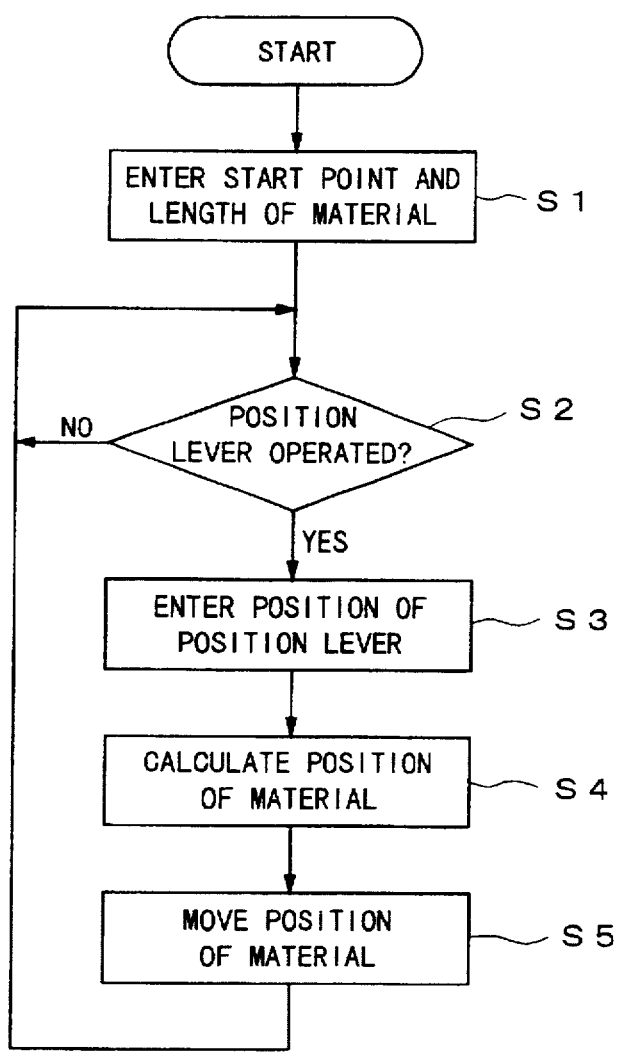
FIG. 4 is a flow chart of a process by the embodiment of the invention.

When the position lever 12 is moved, a picture at a corresponding position on the time axis is retrieved as shown in FIG. 4. That is, since CPU 21 of the computer 1 and CPU 23 of the control panel 4 are bidirectionally connected, when the file of the material video signals is opened, the start point of the file and the length of the material are sent from CPU 21 of the computer 1 to CPU 23 of the control panel 4. The length of the material is known from the end position of the material (step S1).

CPU 23 of the control panel 4 judges whether the position lever 12 has been moved or not (step S2). When the position lever 12 is moved, the current position of the position lever 12 is entered with reference to a corresponding output of the A/D converter 29 (step S3). The position on the time axis of the material is calculated from the position of the position lever 12 (step S4).

The position on the time axis of the material is calculated in the following process. Let the length of the material be $L_A$, the start position of the material be $L_B$, and the position lever 12 be set at the distance $L_C$. Also assume that the positional data of the position lever obtained from the A/D converter 29 consists of 10 bits variable up to 1024. In this case, since changes in position of the position lever 12 and changes in position of the material are proportional, a position $L_x$ of the material to be displayed is $$L_x = L_B + L_A \times (L_C/1024)$$

Once the position of the material is calculated in step S4, it is sent from CPU 23 of the control panel 4 to CPU 21 of the computer 1. CPU 21 of the computer 1 makes access to the video data at the address corresponding to the position of the material through the magnetooptical disk drive 2, and makes the display 5 to display the video data (step S5). After the video data corresponding to the position of the position lever 12 is displayed, the process returns back to step S2 and prepares for any further movement of the position lever 12.

The position lever used for jumping the absolute value of a compile point in the embodiment described above may be replaced by a dial.

According to the invention, the position lever is used to designate a desired absolute position of video signals used as a material, and changes in position of the position lever linearly correspond to changes in absolute position on the time axis of a material. Therefore, an approximate position near a desired compile point can be readily searched out by using the position lever. Additionally, the search dial is provided to designate any desired position of the material in response to the amount of its rotation. Since rotation of the search dial causes changes in picture on the display in accordance with the direction and the amount of the rotation, the picture with the desired search point can be found out and retrieved easily and quickly.

We claim:

1. A compiler system, comprising:

a recording medium for storing video signals to be used as a material; and operation means for compiling said video signals;

said operation means including a first position designating means for designating an absolute position on the time axis of said material, and a second position designating means for designating a dependent position which is a position relative to said absolute position;

wherein said operation means is operable to combine said absolute position and said dependent position to generate an indicated position and wherein said indicated position exhibits a range of values which include values that temporally precede said absolute position on said time axis and values that temporally succeed said absolute position on said time axis.

2. The compiler system according to claim 1, wherein said first position designating means is operable to designate any position in the range inclusively bounded by a start position of said video signals and an end position of said video signals, and wherein movements of said first position designating means causes linearly responsive changes in said absolute position.

3. The compiler system according to claim 1, wherein said first position designating means is a slide mechanism that is slidable along a straight line.

4. The compiler system according to claim 1, wherein said second position designating means is a rotating mechanism, and the amount of rotation of said rotating mechanism determines said dependent position.

* * * * *